March 31, 1964     A. J. CLAISSE ETAL     3,126,629
SURGICAL KNIFE
Filed July 1, 1960

INVENTORS
*Arnold J. Claisse*
*Edward D. Collett*

3,126,629
SURGICAL KNIFE
Arnold James Claisse, Purbeck, Shiplake-on-Thames, Oxon, and Edward Denbigh Collett, Upper Basildon, England, assignors to Gillette Industries Ltd., Isleworth, Middlesex, England, a corporation of Great Britain
Filed July 1, 1960, Ser. No. 40,347
3 Claims. (Cl. 30—151)

This invention relates to cutting instruments of the type that must come to the user's hand with full assurance of sterility and protection from mechanical damage. The invention comprises a new and improved instrument in which these results are secured by molding or casting the handle of the instrument of a thermoplastic material about a sharp edge blade, and in the same operation causing the thermoplastic material to form a protective sheath enclosing the cutting edge and if desired other portions of the blade.

The invention may be embodied with particular advantage in surgical knives or scalpels. Heretofore, it has been the practice to provide such scalpels with replaceable blades but these are likely to become damaged in being removed from their package or in being sterilized. Since a sterilized blade is often held in metal forceps in being inserted into the scalpel handle, damage often occurs at this stage also. Furthermore, due to wear in the handle and a tendency for replacement blades of incorrect size to be used, such blades are often not securely and rigidly held in the handle.

An important and novel feature of the present invention consists in molding at one operation both the handle of the instrument and a blade protecting sheath. This may be effected with a minimum of expense and a maximum of protection. An important advantage of this procedure is that in the same molding operation the handle may be interlocked with the blade, as by the formation of studs or keys in perforations of the blade tang.

A further feature of the invention consists in molding with the protective sheath a strip or projection of the same material which extends clear of the blade, and may be conveniently utilized as a grip for stripping the sheath from the blade in preparation for using the instrument.

Figure 1:
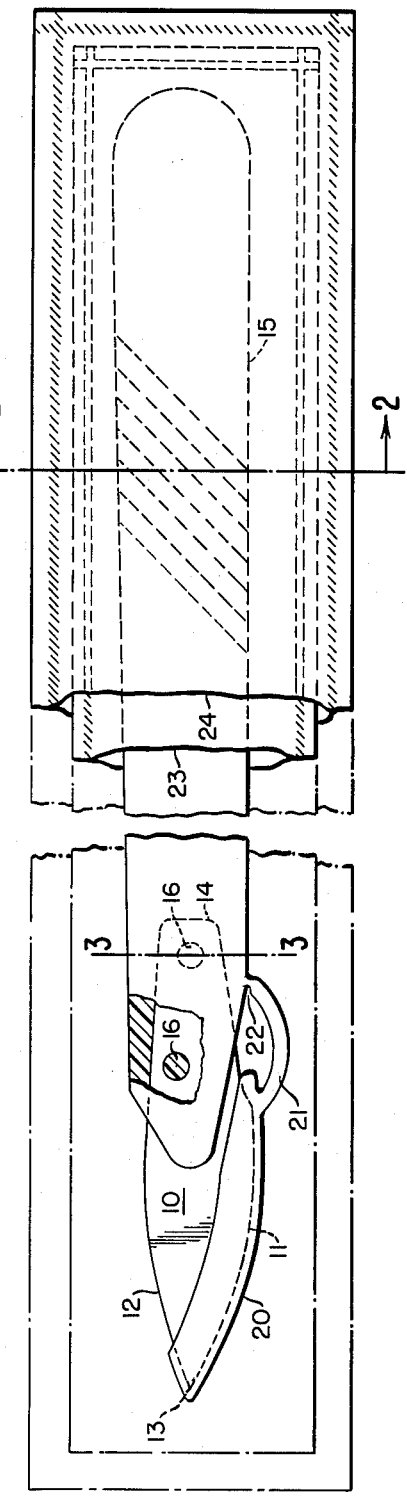
Figure 2:
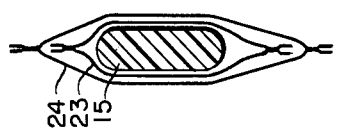
Figure 3:
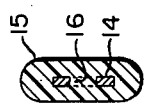

These and other features of the invention will be best understood and appreciated from the following description of a preferred embodiment thereof, selected for purposes of illustration and shown in the accompanying drawings in which, FIG. 1 is a view in side elevation of the scalpel with certain parts broken away, FIG. 2 is a view in cross section on the line 2—2 of FIG. 1, and FIG. 3 is a view in cross section of 3—3 of FIG. 1.

In the illustrative scalpel, the blade 10 is formed of sheet steel and shaped to present a sharpened convex cutting edge 11 and an unsharpened convex back edge 12 converging to a sarp tip 13. The blade merges rearwardly into a tang or shank 14 having a pair of perforations spaced a substantial distance apart lengthwise of the tang. The precise shape of the blade is of secondary importance and may take a form adapted for the special uses of the scalpel.

The handle 15 is molded or cast of suitable thermoplastic material in thin elongated form and corrugated to facilitate gripping. It is molded so as to enclose at its forward end the blade 10 and in the molding operation the studs or keys 16 are formed in the perforations of the tang thereby permanently interlocking the blade and handle together. As material for the handle, high density polythene, impact polystyrene, or other suitable synthetic resinous compounds may be employed and molded upon the blade in an injection molding process.

In the molding process, a protective sheath 20 is formed about the cutting edge 11 of the blade extending on both sides thereof and forming a pocket for the tip 13 of the blade. The sides of the sheath extend from the cutting edge part way over the major side surfaces of the blade and are joined at the tip. The rear end of the sheath merges into an outward bowed strip 21 which extends clear of the blade rearwardly and is joined to the handle by a constricted and easily frangible neck 22. The strip 21 constitutes the molding runner and gate between the handle and the sheath. The sheath may be conveniently removed from the cutting edge of the blade by fracturing the strip 20 at the constriction 22, and using the strip as a tab or grip to remove the sheath from the cutting edge by rotating the sheath on its point of engagement with the blade tip 13. It will be seen that the arrangement is such that the sheath may be removed without the necessity of touching the cutting edge of the blade, or risk to the user.

The complete scalpel, as above described, may now be hermetically sealed in one or more envelopes of thin transparent plastic material. In FIGS. 1 and 2, the scalpel is shown as enclosed within an inner envelope 23, and a larger outer envelope 24. The two envelopes are of such size that they may be conveniently nested one within the other and closed by heat sealing. The scalpel within its inner envelope 23, and the envelope itself, may now be completely sterilized while within the outer envelope 24. Upon reaching the surgeon's hands therefore the outer envelope 24 may be opened exposing the completely sterilized inner envelope 23, and the latter may then be opened immediately before the operation thus eliminating all danger of infecting the edge of the blade by contact with an unsterilized envelope.

While the invention has been described as embodied in a scalpel for surgical use, it is not limited in that respect but may be usefully adapted for the construction and protection of any cutting instrument including, of course, shaving equipment.

Having thus disclosed our invention and described in detail an illustrative embodiment thereof together with a method of producing the same, we claim as new and desire to secure by Letters Patent:

1. A cutting instrument comprising a blade, a handle therefor, said blade having an edge and terminating in a tip at one end, the other end of said blade being positioned within and secured to said handle, at least a portion of said blade extending outwardly from said handle being sharpened, and a protective sheath engaging and enclosing the sharpened portion of said blade including the tip thereof, said sheath being attached to said handle solely by a readily frangible connection formed integrally with and extending from the end of said sheath remote from said tip, said connection having at least a portion thereof spaced from and overlying a portion of said edge to provide a tab for easy removal of the sheath after said connection has been broken.

2. A cutting instrument according to claim 1 wherein said blade is formed of metal and said handle, sheath and connection are of plastic material and integrally formed.

3. A cutting instrument in the form of a surgical knife comprising a handle of moldable synthetic resin, a flat knife blade having a tang part imbedded in said handle, said blade having an edge extending outwardly from said handle to a tapered end, at least a portion of the edge of said blade being sharpened, a detachable sheath enclosing the sharpened portion of said blade and engaging the tapered end thereof, and a connecting strip attached at one end to said sheath and at the other end to said handle and having at least a portion thereof spaced from and overlying a portion of said edge to provide a tab for easy removal of the sheath after said strip has been broken, said strip having a frangible portion of reduced cross-section where it joins said handle, said strip and sheath being of similar material to that of said handle and molded integrally therewith.

References Cited in the file of this patent

UNITED STATES PATENTS

| | | |
|---|---|---|
| 144,177 | Williams | Oct. 28, 1873 |
| 739,371 | Allen | Sept. 22, 1903 |
| 1,593,935 | Gerick et al. | July 27, 1926 |
| 2,239,536 | Muros | Apr. 22, 1941 |
| 2,288,555 | Jacques | June 30, 1942 |
| 2,466,898 | Johnson | Apr. 12, 1949 |
| 2,520,355 | Bell | Aug. 29, 1950 |
| 2,700,820 | Garduno | Feb. 1, 1955 |
| 2,789,346 | Algier et al. | Apr. 23, 1957 |
| 2,866,542 | Svirchev | Dec. 30, 1958 |
| 2,901,823 | Widen | Sept. 1, 1959 |
| 2,902,146 | Doherty | Sept. 1, 1959 |

FOREIGN PATENTS

| | | |
|---|---|---|
| 747,162 | Great Britain | Mar. 28, 1956 |

UNITED STATES PATENT OFFICE
CERTIFICATE OF CORRECTION

Patent No. 3,126,629             March 31, 1964

Arnold James Claisse et al.

It is hereby certified that error appears in the above numbered patent requiring correction and that the said Letters Patent should read as corrected below.

In the grant (only), lines 3 and 13, for "Gillett Industries Ltd.", each occurrence, read -- Gillette Industries Ltd. --; column 1, line 57, for "sarp" read -- sharp --.

Signed and sealed this 4th day of August 1964.

(SEAL)
Attest:

ERNEST W. SWIDER
Attesting Officer

EDWARD J. BRENNER
Commissioner of Patents